US006776502B2

United States Patent
Hung (12) United States Patent
(10) Patent No.: US 6,776,502 B2
(45) Date of Patent: Aug. 17, 2004

(54) FISHING LAMP

(76) Inventor: Chih-Wen Hung, No. 17-4, Waipu, 16 Lin, Waipu Li, Houlung Jen, Mioli Hsien (TW)

( * ) Notice: Subject to any disclaimer, the term of this patent is extended or adjusted under 35 U.S.C. 154(b) by 38 days.

(21) Appl. No.: 10/261,690

(22) Filed: Oct. 2, 2002

(65) Prior Publication Data

US 2004/0066650 A1 Apr. 8, 2004

(51) Int. Cl.[7] ............................................. F21V 31/00
(52) U.S. Cl. ....................... 362/158; 362/267; 362/253; 441/16
(58) Field of Search ................................ 362/158, 157, 362/267, 249, 391, 253, 234, 363, 800; 441/13, 16, 17, 18

(56) References Cited

U.S. PATENT DOCUMENTS 2,539,403 A * 1/1951 Crim et al. ................... 441/17
6,086,218 A * 7/2000 Robertson ................... 362/157

* cited by examiner

Primary Examiner—Thomas M. Sember
Assistant Examiner—Bao Q. Truong
(74) Attorney, Agent, or Firm—Troxell Law Office PLLC (57) ABSTRACT

A newly constructed fishing lamp is disclosed. It is capable of reducing the production cost and simplifying fabrication process by fabricating several essential parts integrally in one piece so as to save use of extra separated components. Several O-rings are employed to hermetically seal the lamp housing to assure the perfect watertight feature. A durable, colorful, and power saving LED-flash is selected as the light source to emit diffused light-imitating as that of planktons to tempt fish group approaching with the consumption of very small amount of power. A specially designed 360° turnable bearing including a suspension ring to hang the fishing lamp thereby capable of preventing lamps from overturning in the water stream incurring kinking of fishing rope or curling of fishing line that leads to a broken rope or line.

14 Claims, 9 Drawing Sheets

FISHING LAMP

BACKGROUND OF THE INVENTION

1. Field of the Invention

The present invention relates to a fishing lamp, and more particularly, to a newly constructed fishing lamp whose light source, a LED-flash, is fabricated integrally with its lighting fixture by highly precise technique so as to achieve water tightness in structure thereby assuring its quality and prolonging its lifetime.

2. Description of the Prior Art

Figure 1:
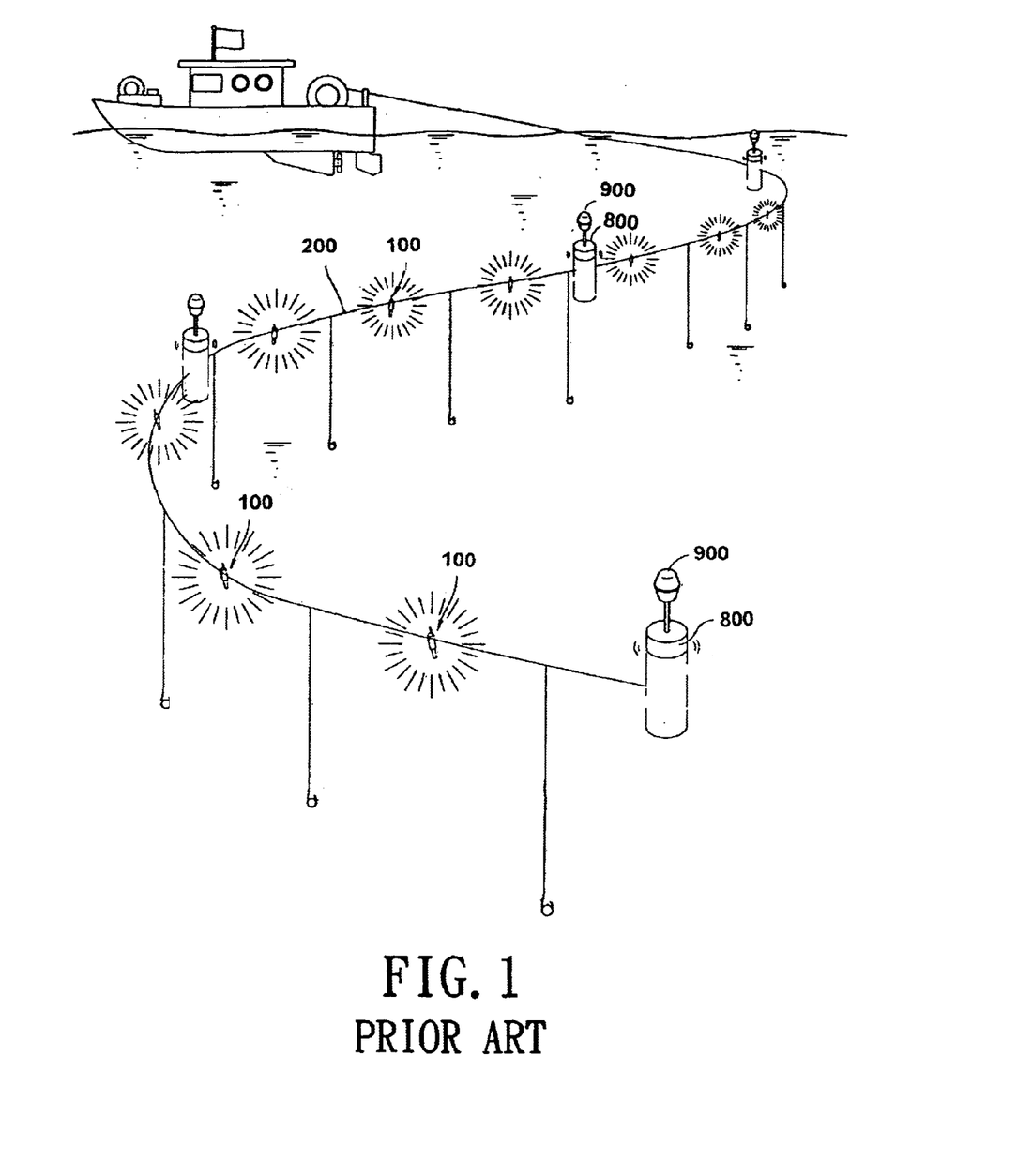
FIG. 1 is a schematic view showing a conventional layout of fishing tackles for night time professional fishing.
Figure 2:
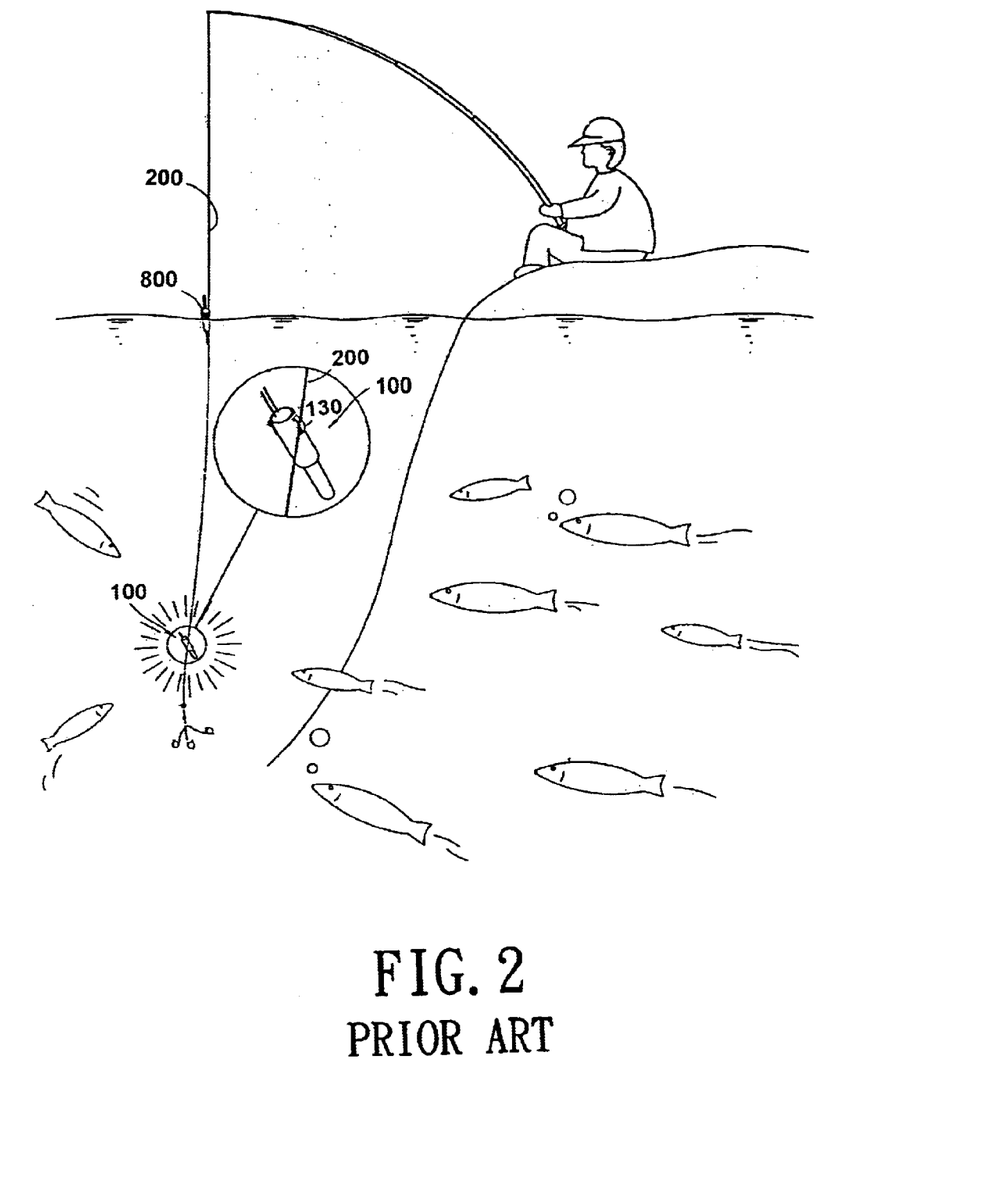
FIG. 2 is a schematic view showing how a pastime night fishing is carried out using one fishing rod and one fishing lamp.

At the night time professional fishing operation, a conventional layout of tackles shown in FIG. 1 is a fishing rope 200 on which a plurality of floats 800 each incorporated with a marking head 900 is extended from the ship stern to encircle a water region. Then, a string of fishing lamps 100 are suspended on the rope 200 perforating the lugs 130 provided for each fishing lamp 100. The fishing lamps 100 together with the rope 200 drift about in the water stream so as to tempt groups of fish with lamp emitting light pretending as if that were diffused light from planktons. FIG. 2 is a schematic view showing how a pastime night fishing is carried out using only one fishing rod and one fishing lamp.

Figure 3A:
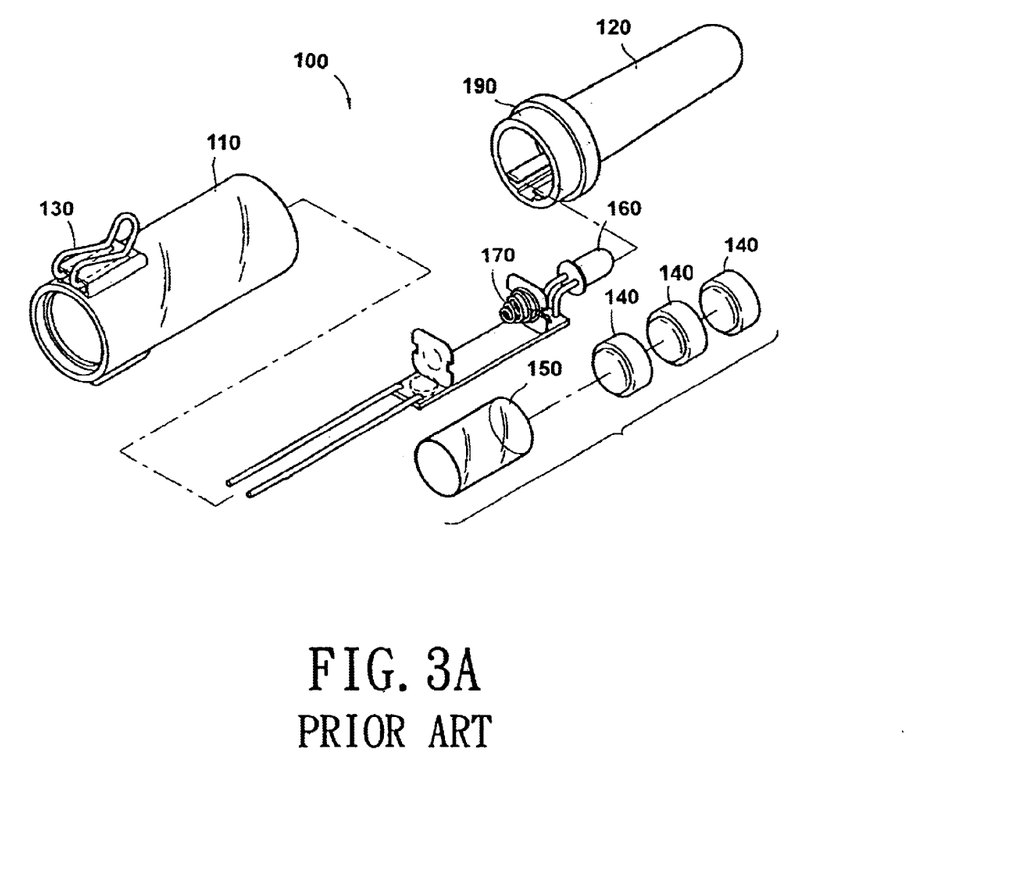
FIG. 3A is an exploded view of a conventional fishing lamp.
Figure 3B:
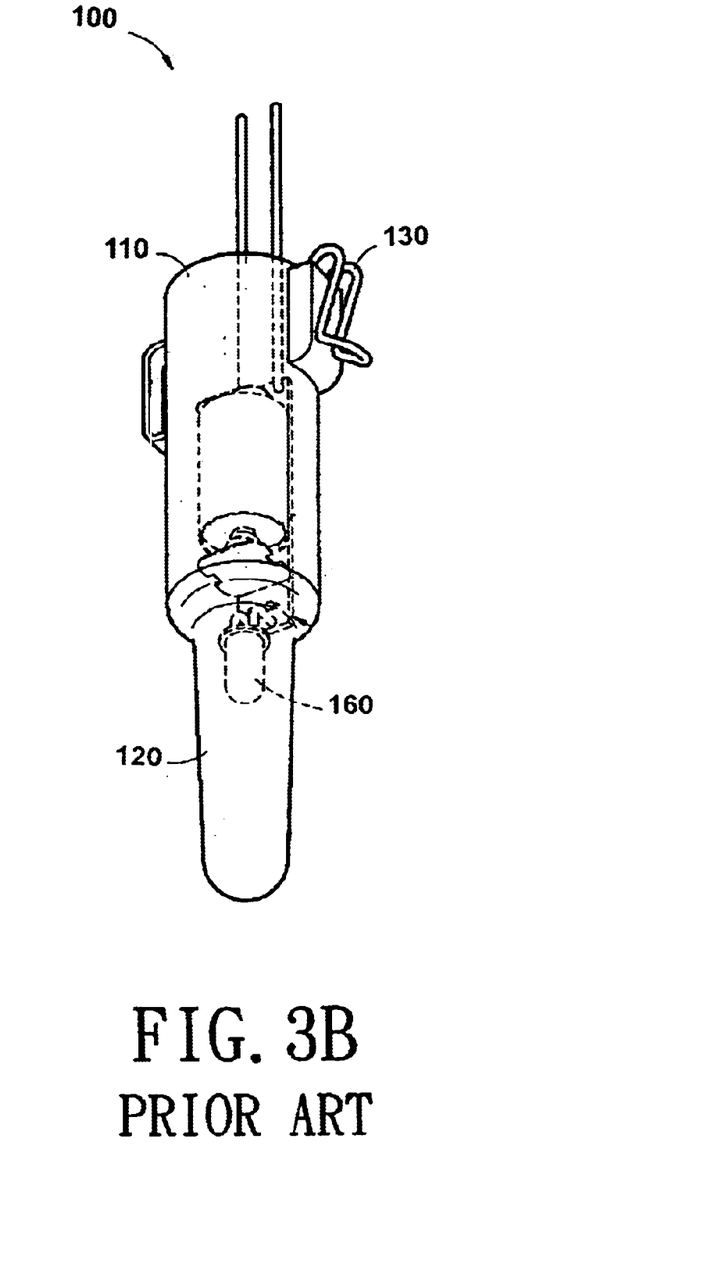
FIG. 3B is an assembled view of a conventional fishing lamp.

FIG. 3A is an exploded view of a conventional fishing lamp. As shown in FIG. 3A, a hollow cylindrical lamp housing is split into an upper housing 110 and a lower housing 120. The upper housing 110 is essentially for accommodating a dry battery unit 140 with an annular shell 150. A light source 160 and a coiled spring 170 for holding the battery unit 140 and conducting its power to the light source 160 is equipped on a pallet. The upper housing 110 is mated with the lower housing 120 by fitting it into a socket 190 formed at one end of the lower housing 120. The assembly view of the above-mentioned components for the conventional fishing lamp is shown in FIG. 3B.

Besides, in order to prevent entry of water and moisture, the opening at the end of the upper housing 110 is filled with a hermetic seal (for example, epoxy resin.)

With this structure, the conventional fishing lamp has been serving for professional and pastime fishing years and years effectively to a certain extent, there are several noteworthy inherent shortcomings which should be palliated, namely:

1. The fishing lamp constructed as such is too complicated so that the yield of fabrication will not be satisfactory.
2. The powerhungry lamp causes the generally applicable button type Li batteries or carbon zinc batteries to be replaced frequently from time to time, that is not only tiresome but also prone to damage the other component parts.
3. The maintenance cost is exacerbately increased by frequent battery replacement.
4. Hermetic seal at the lamp housing opening causes difficult to replace inside components.
5. Water trends to seep into the lamp housing from the socket juncture that leads to shortening the lamp life.
6. The fishing rope is easy to become kinked and the fishing line curled by the lamps overturning in the water stream and finally break to loose the fishing tackles.

Aiming at the aforesaid shortcomings, the present inventor has been endeavoring for a long time intensified research and experimentation to find out the solution and finally has come to realization of the present invention.

SUMMARY OF THE INVENTION

It is a first object of the present invention to provide a new fishing lamp capable of reducing its production cost and simplifying its fabrication process.

To achieve this object, this new fishing lamp and housing are integrately constructed so as to save use of extra separated components.

It is a second object of the present invention to provide a new fishing lamp capable of hermetically sealed.

To achieve this object, a plurality of O-rings is employed to assure the perfect watertight performance.

It is a third object of the present invention to provide a new fishing lamp which is extremely power saving yet is able to attract fish group.

To achieve this object, a durable, colorful, and power saving LED-flash is adopted as the light source, which emits diffused light as that of planktons.

It is a fourth object of the present invention to provide a new fishing lamp capable of preventing the fishing rope from kinking and the fishing line from curling by the lamps overturning in the water stream.

To achieve this object, a 360° turnable bearing including a suspension ring is provided at each end of the upper and the lower lamp housing so as to avoid above said phenomena.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

FIG. 1 to FIG. 3 are drawings related to a fishing lamp according to the conventional technique about whose structural disadvantages are described in the foregoing paragraphs hence will not be repeated herein.

Figure 4A:
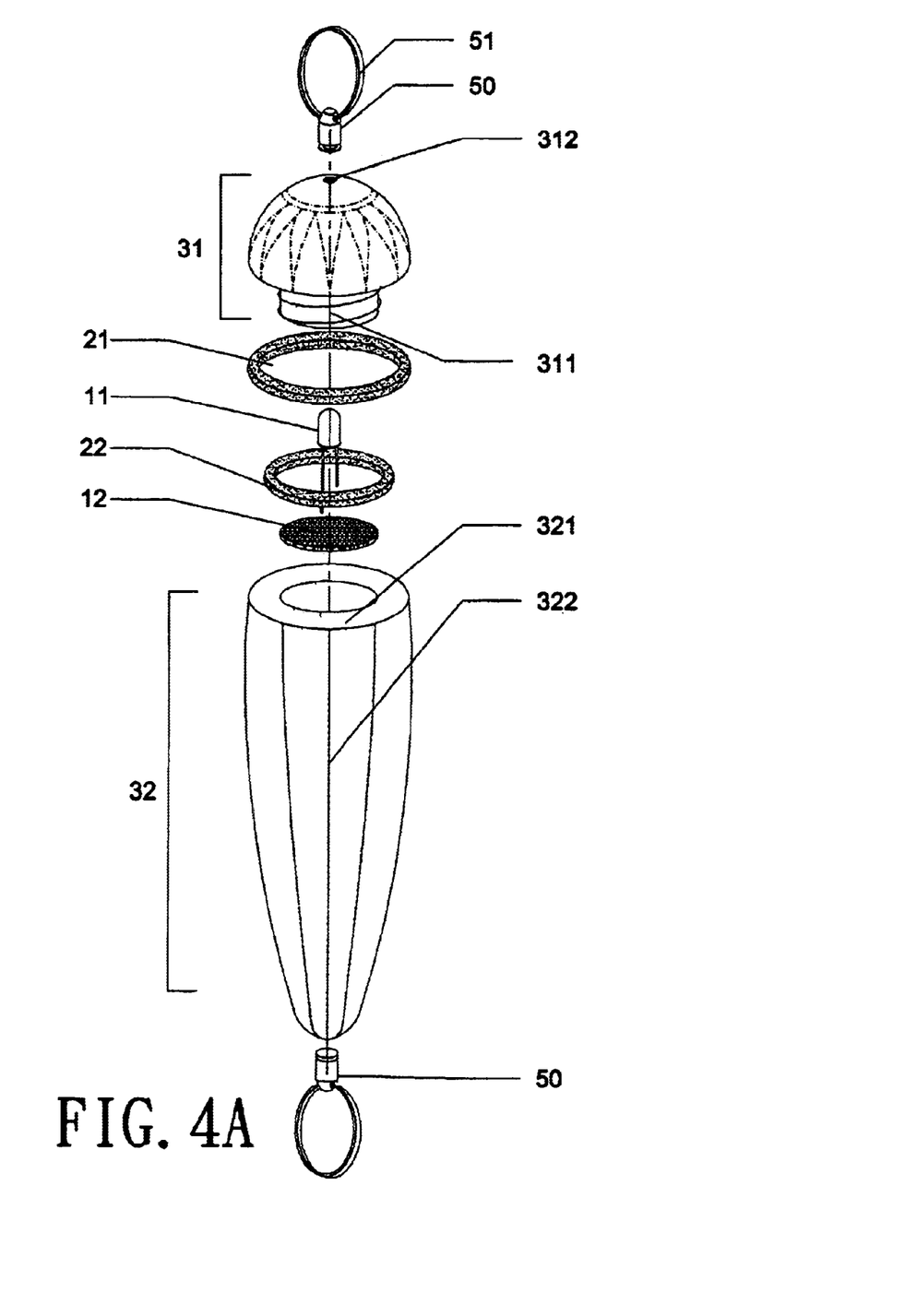
FIG. 4A is an exploded view of the fishing lamp according to the present invention.
Figure 4B:
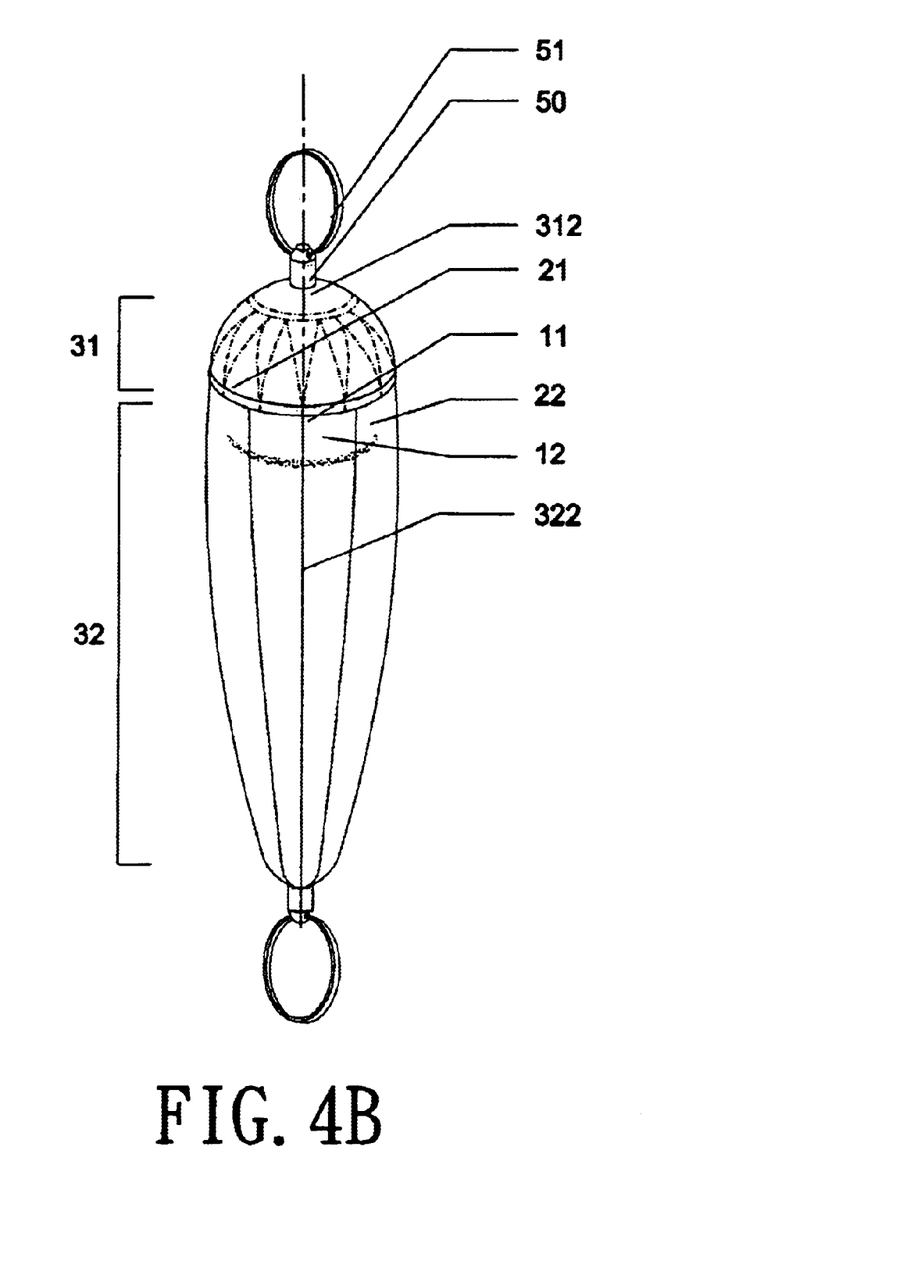
FIG. 4B is an assembled view of the fishing lamp according to the present invention.

FIG. 4A is the exploded view showing the new structure of the fishing lamp according to the present invention. As shown in FIG. 4A, this new fishing lamp comprises a light source unit 40 composed of an automatic flasher (LED-flash) 11 and a conducting pad 12 (See also FIG. 5.) Colors can be produced by this LED-flash 11 are preferably red, orange, and yellow, and the light intensity may be classified into strong, medium, and diffusing, while the flashing interval is preferably 1 sec. to 2 sec. so as to attract a group of fish. A plurality of O-rings made of elastic and hermetical resin is provided for the lamp structure. The O-ring contains an outer ring 21 and an inner ring 22. The outer ring 21 is encircling the bottom of an upper lamp housing 31 to hermetically seal the gap between the upper lamp housing 31 and an associated lower lamp housing 32 when the former is screwed into the latter with its threaded socket 311 formed at its lower end thereof. Both upper and lower lamp housings 31 and 32 are made of transparent material (as acryl or polycarbonate) and are striped on both housing surfaces by itching so as to enhance flashing effect of the lamp. The end portion of the socket 311, the conducting pad 12, and the inner ring 22 are formed integrally in one piece. One end edge of the lower lamp housing 32 is formed into a groove 321 to accept the socket 311 of the upper lamp housing 31 to screw in. Downward to the groove 321 in the lower lamp housing 32 is a battery chamber 322 for accommodating a power supply unit 40 including a battery unit 41 later with reference to FIG. 5. Besides, a turnable bearing 50 associated with a suspension ring 51 is provided on the upper and the lower lamp housings end terminals.

Figure 5:
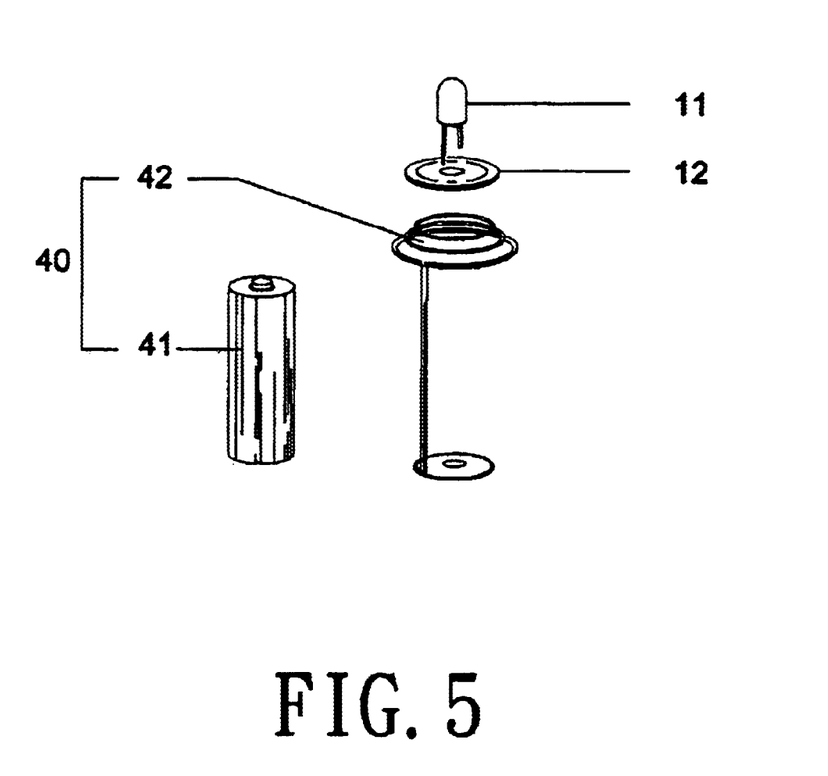
FIG. 5 is an exploded view showing the light ad power source structure of the present invention.

FIG. 5 is an exploded view showing the light and power source structure including a light source unit 10 and its power supply unit 40. The light source unit 10 is composed of an above mentioned LED flash 11 and the conducting pad 12 preferably formed in circular shape whose bottom edge is coated with a conductive substance and is welded to the LED-flash 11, this bottom conductive substance is contacted with the power supply unit 40, which is composed of the battery unit 41 and the coil spring 42, so as to supply electricity for generating light. Meanwhile, the conducting pad 12 has an elastic resin ring fitted around its circumferential edge thereof.

Figure 6A:
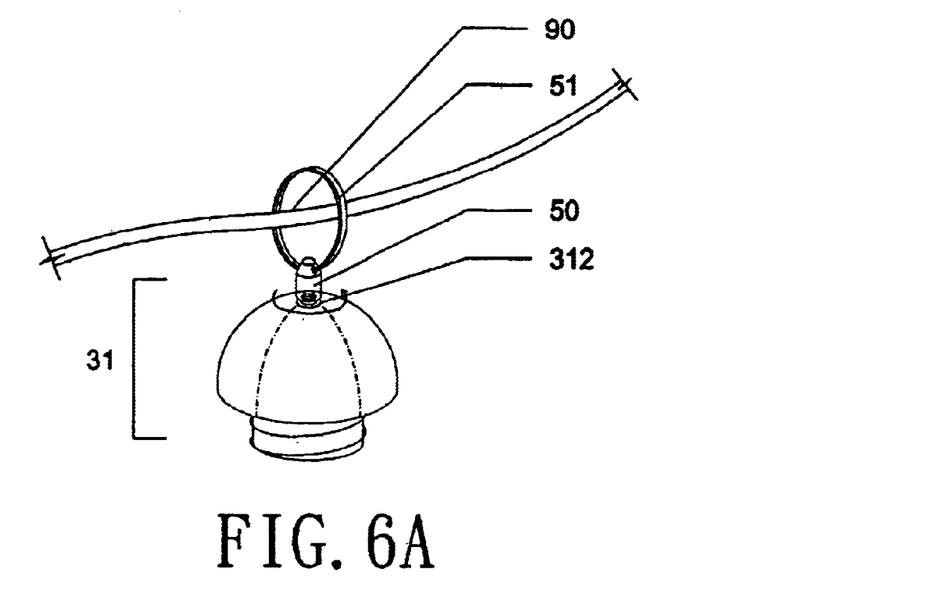
FIG. 6A is a three dimensional view of the 360° turnable bearing associated with a suspension ring according to the present invention.
Figure 6B:
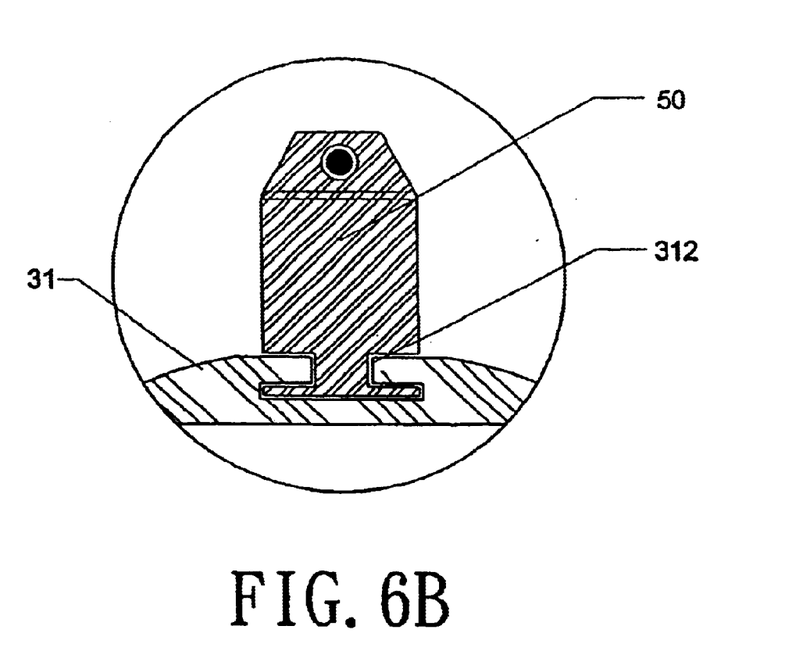
FIG. 6B is a cross-sectional view of the 360° turnable bearing associated with a suspension ring according to the present invention.
Figure 7:
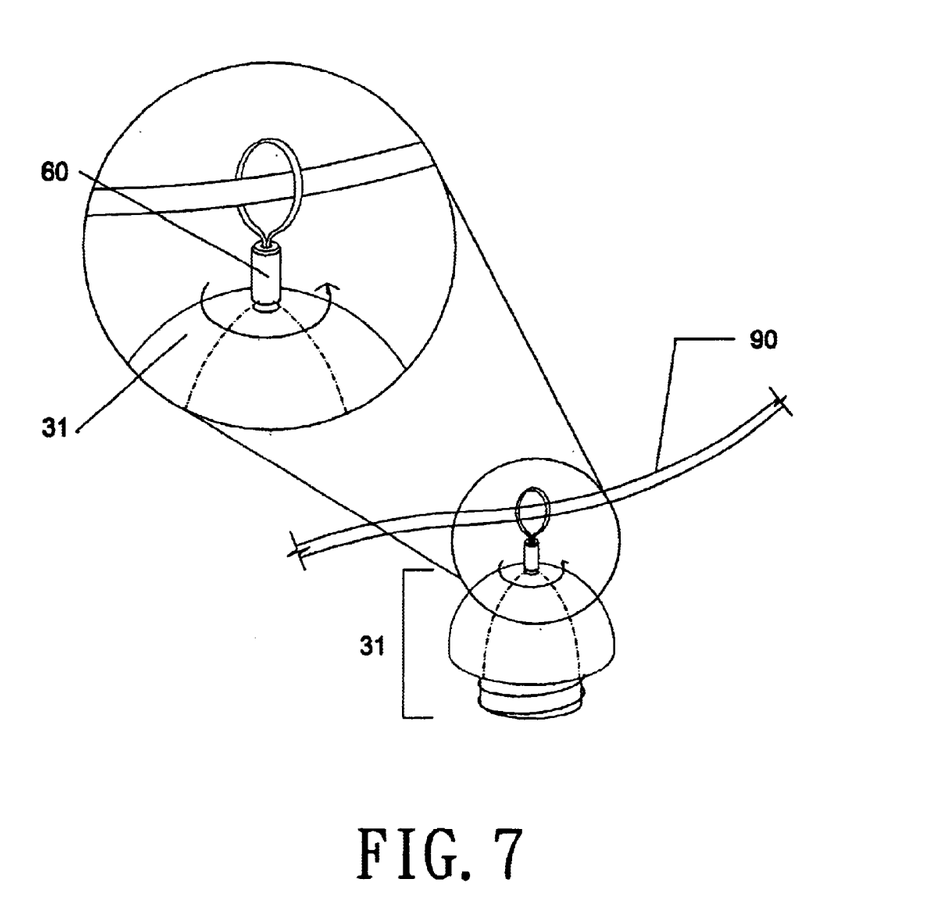
FIG. 7 is a schematic view showing of a practical embodiment of a buckling ring used in the present invention.

FIGS. 6A and 6B are a three-dimensional view and a cross-sectional view of the 360° turnable bearing associated with a suspension ring respectively. As shown in these two drawings, drilled holes 312, and 323 (not shown) are formed at the ends of the upper and the lower lamp housings 31 and 32 respectively for accepting the tunable bearings 50. The tip of the bearing 50 is formed into a recessed groove 52 to fit into the drilled hole 312 (323) of the upper (lower) lamp housing 31 (32) such that the fishing lamp 100 is suspended with the suspension ring 51 on the fishing rope 200 so as to drift along with the water stream free from the fear of overturning. Besides, as shown in FIG. 7, the turnable bearing 50 can be substituted by a smaller buckling ring 60 which is suitable for smaller fishes.

It is understood that the newly constructed fishing lamp structure provided by the present invention is made perfectly watertight to prolong its lifetime by fabricating the LED-flash and the lamp housing integrally in one piece, and the fear that the fishing line might curl, or fishing rope might kink causing breaking of the line or rope can be released by provision of a 360° turnable bearing or a small buckling ring associated with the suspension ring.

As described above, the present invention is not limited to the above embodiment, and it is clearly understood that many variations can be made within the scope and spirit of the present invention by anyone skilled in the art.

What is claimed is:

1. A new structure of fishing lamp comprising:
    a light source unit composed of an automatic flashing LED-flash, and a conducting pad for attracting a group of fish;
    several O-rings each made of a hermetical and elastic resin to be fitted to the sides of an upper lamp housing and said conducting pad;
    said upper and a lower lamp housings, being formed of a transparent substance, and being striped on both housing surfaces for enhancing fish group attracting effect, and capable of accommodating a battery unit incorporated with a coil spring for power supply to said light source;
    a plurality of turnable bearings associated with suspension rings for suspending said fishing lamp on a fishing rope to drift along with a water stream;
    with this structure, said automatic flashing LED-flash is integrally formed in one piece with said lower lamp housing by modern high technology so as to be watertight and maintain a durability of said fishing lamp.

2. The fishing lamp of claim 1, wherein light colors of said LED-flash include red, orange, and yellow, wherein a light intensity thereof is classified into strong, medium, and diffusing, wherein a flashing interval is 1 second to 2 seconds.

3. The fishing lamp of claim 1, wherein the shape of said conducting pad is circular.

4. The fishing lamp of claim 1, wherein the bottom edge of said conducting pad is coated with a conductive substance, and is welded to said LED-flash.

5. The fishing lamp of claim 1, wherein said conducting pad has an elastic resin fitted around a circumferential edge thereof.

6. The fishing lamp of claim 1, wherein said conducting pad is formed integrally in one piece with said upper lamp housing.

7. The fishing lamp of claim 1, wherein both said upper and lower lamp housings are made of a transparent material selected from acryl and polycarbonate, and are striped on the surfaces of said lamp housings so as to enhance the light flashing and fish group attracting effect.

8. The fishing lamp of claim 1, wherein said upper lamp housing has a threaded socket formed at its a lower end for screwing into said lower lamp housing.

9. The fishing lamp of claim 8, wherein the end portion of said upper lamp housing socket is formed integrally in one piece with said conducting pad and an inner O-ring.

10. The fishing lamp of claim 7, wherein one end edge of said lower lamp housing is formed into a groove to accept said upper lamp housing socket to screw in.

11. The fishing lamp of claim 10, wherein downward to said groove of the lower lamp is a battery chamber for accommodating a power supply unit including a battery unit an a coil spring.

12. The fishing lamp of claim 1, a drilled hole is formed at the end of each upper and lower housing for accepting one of the plurality of turnable bearings respectively.

13. The fishing lamp of claim 12, wherein a tip of each of the plurality of turnable bearings is formed into a recessed groove to fit into said drilled hole of said upper or lower lamp housing.

14. The fishing lamp of claim 1, wherein said turnable bearings are substituted by a small buckling ring.

* * * * *